US009332736B2

(12) United States Patent
Underwood

(10) Patent No.: US 9,332,736 B2
(45) Date of Patent: May 10, 2016

(54) DEODORIZING, STERILIZING AND MOISTURE REDUCTION SYSTEM FOR ANIMAL WASTE AND LITTER

(71) Applicant: Roy E. Underwood, Young Harris, GA (US)

(72) Inventor: Roy E. Underwood, Young Harris, GA (US)

( * ) Notice: Subject to any disclaimer, the term of this patent is extended or adjusted under 35 U.S.C. 154(b) by 93 days.

(21) Appl. No.: 13/986,478

(22) Filed: May 7, 2013

(65) Prior Publication Data

US 2013/0298842 A1 Nov. 14, 2013

(51) Int. Cl.
*A01K 31/04* (2006.01)

(52) U.S. Cl.
CPC ...................... *A01K 31/04* (2013.01)

(58) Field of Classification Search
CPC ..... A01K 31/04; A01K 31/22; A01K 1/0128; A01K 1/0132; A01K 31/18; A61L 2202/00; A61L 2202/11; A61L 2202/14; A61L 2202/15; A61L 2202/16; A61L 2/0047; A61L 2/10; A61L 2/202; A61L 11/00; B02C 13/02; B02C 21/02; B02C 2021/023
See application file for complete search history.

(56) References Cited

U.S. PATENT DOCUMENTS

| 4,619,412 | A | * | 10/1986 | Willingham | 241/101.762 |
|---|---|---|---|---|---|
| 5,078,328 | A | | 1/1992 | Willingham | |
| 5,151,250 | A | * | 9/1992 | Conrad | 422/2 |
| 5,266,275 | A | * | 11/1993 | Faddis | 422/116 |
| 5,514,345 | A | * | 5/1996 | Garbutt et al. | 422/124 |
| 5,566,627 | A | * | 10/1996 | Pryor | A01B 17/00 111/118 |
| 5,919,417 | A | * | 7/1999 | Rutland | 422/28 |
| 6,630,105 | B1 | * | 10/2003 | O'Neill et al. | 422/24 |
| 6,710,357 | B1 | * | 3/2004 | Schweitzer | 250/492.1 |
| 7,682,562 | B2 | * | 3/2010 | Ciechanowski | A61L 2/202 4/541.1 |
| 2002/0168289 | A1 | * | 11/2002 | McVey | 422/28 |
| 2003/0143108 | A1 | * | 7/2003 | Wasinger | A01N 59/00 422/28 |
| 2003/0192485 | A1 | * | 10/2003 | Opfel | 119/526 |
| 2003/0192816 | A1 | * | 10/2003 | Opfel | 209/133 |
| 2004/0050338 | A1 | * | 3/2004 | Ford | 119/437 |

(Continued)

FOREIGN PATENT DOCUMENTS

CN 103355063 * 10/2013 ............ A01F 25/14

OTHER PUBLICATIONS

Machine translation of CN 103355063, published Oct. 2013, to Lu et al.*

(Continued)

*Primary Examiner* — Kathleen Alker
(74) *Attorney, Agent, or Firm* — Smith Gambrell & Russell LLP

(57) ABSTRACT

A portable system for recycling used animal litter, such as chicken litter, in place which one can use to accommodate a succession of animals, such as flocks, in the same commercial chicken house, with the same bedding material. The system comprises a litter pulverizer mounted within a hood-like housing, a high output ozone generator, fluidly connected thereto, which, in use, discharges ozone into a flux of pulverized animal litter and pathogen-laden dust particulates, killing pathogens and neutralizing ammonia odors in the process, and an ultraviolet light source for further sterilizing pulverized litter and for destroying excess ozone discharged with it from the hood-like housing's base. Enhancing the system's pathogen-killing capacity are at least one hot air blower also fluidly connected to the hood-like housing and a moisture detector. The latter measures, in real time, the dryness of ozone-treated litter being discharged from the hood-like housing onto the chicken house floor.

20 Claims, 4 Drawing Sheets

(56) References Cited

U.S. PATENT DOCUMENTS

| | | | |
|---|---|---|---|
| 2005/0287052 A1* | 12/2005 | Ravanello et al. | 422/186.07 |
| 2006/0140817 A1* | 6/2006 | Cumberland et al. | 422/28 |
| 2010/0301147 A1* | 12/2010 | Harkess et al. | 241/23 |
| 2012/0168545 A1* | 7/2012 | Bender | 241/101.71 |
| 2013/0199581 A1* | 8/2013 | Christopherson | 134/103.2 |
| 2013/0224085 A1* | 8/2013 | Antinozzi | A61L 2/18 422/186.08 |
| 2013/0287626 A1* | 10/2013 | Benedek et al. | 422/2 |

OTHER PUBLICATIONS

Priefert Ranch Equipment advertisement for Litter Saver, 2 pages, unknown publication date, published by Priefert Ranch Equipment of Mt. Pleasant, TX.

* cited by examiner

DEODORIZING, STERILIZING AND MOISTURE REDUCTION SYSTEM FOR ANIMAL WASTE AND LITTER

CROSS REFERENCE TO RELATED APPLICATION

This application is a non-provisional application of the earlier filed provisional application Ser. No. 61/688,109, filed May 8, 2012, and claims the benefit of the priority of the filing date of May 8, 2012, pursuant to 35 U.S.C. Sec. 119(e).

FIELD OF THE INVENTION

This invention relates generally to machines for recycling used animal litter, such as poultry or chicken litter, in place.

BACKGROUND OF THE INVENTION

Current market conditions dictate that chicken growers raise broilers for 26 to 45 days and then sell them. As a consequence, chicken farmers are in need of a system which they can use, at approximately one month apart intervals and under any weather conditions, to deodorize and kill the pathogens in used chicken litter so that the individual farmer can accommodate a succession of flocks, in the same chicken house, with the same bedding material. Moreover, because the farmers work on small profit margins, they must, in preparation for growing the next batch of birds, clean up the used chicken litter, if it is to serve once again as bedding, in as short a time period as possible.

Constituents of used chicken litter include both ammonia (the main source of its pungent odor) and pathogens, byproducts of urine and feces, respectively, which the growing chickens discharge as waste from their bodies and deposit onto the litter at their feet. Environmental contaminants such as these, if not checked, can build up in chicken houses to levels which not only adversely affect the health of the farmers but also allow diseases to be transmitted from one flock to the next. In an attempt to protect both humans and birds alike, Federal and state regulators have placed certain limits on the concentrations of environmental contaminants.

Complicating the cleanup of chicken litter is the well-known fact that pathogens reproduce in moist litter; and to stop this reproductive process, the litter needs to be dried sufficiently to reduce its moisture content to less than 50 percent. Not surprisingly, the individual operator tasked with cleaning up chicken litter is the one who must determine, on the basis of the actual wetness of the caked litter, how best to use whatever equipment is available to kill the pathogens. For example, in its catalog entitled, "Poultry Equipment: Turning Waste Into Profit", the manufacturer of the Priefert® Litter Saver, a prior art machine which, during use, lifts up hard-caked chicken litter and simultaneously pulverizes it, leaves such "details" to the operator's discretion: "Recommended 3 passes per house, 8 hours apart depending on temperature, humidity and wetness of the cake."

SUMMARY OF THE INVENTION

The object of this invention is to provide a system in which ozone, an agent which, as tests have shown, can both kill pathogens and neutralize airborne ammonia odors, is brought into direct contact with used animal waste and litter, such as chicken litter, as it is being pulverized, in such a way that the litter can be cleaned up and made suitable for use with a new animals or a flock in as short a time period as possible.

A further object of this invention is to provide such a system in which the pulverized used chicken litter, after its exposure to ozone, is irradiated with ultraviolet light, so that not only can those pathogens, which may have survived in the ozone-exposed litter, be killed but also excess ozone discharged in the air with the pulverized litter can be destroyed.

A still further object of this invention is to provide such a system built into a very portable machine in which, during use, the moisture content of the pulverized used chicken litter, after its exposure to ozone, is measured continually so that the machine's operator can know, in real time, the condition of the pulverized litter and, if need be, adjust the rate at which caked chicken litter is fed into the machine in order to reduce the pulverized litter's moisture content below 50 percent.

In accordance with the present invention, there is provided a system retrofitted onto a machine which utilizes a rotary mechanism mounted within a housing which is closed except on its underside, to both free used litter caked on the house pad of a chicken house and then pulverize the litter as it is being lifted up within the housing, wherein the system includes an ozone generator with its own internal fan 12a, a manifold which fluidly connects the air flow output from the ozone generator to the housing's interior, and means, including at least one blower, for distributing air containing generator-produced ozone throughout the housing, so that the generator, at any given instant during its use, injects ozone onto multiple small pieces of pulverized chicken litter as well as onto pathogen-laden dust particulates, as these pieces and particulates are churned about within the housing.

Preferably, the machine onto which the system is retrofitted is either self-propelled or can be pulled by a tractor and, when pulled by the latter, is offset in such a way that the machine can access each of those floor spaces within a commercial chicken house whereon litter has been spread for use as bedding.

The system preferably also includes an ultraviolet light source which is mounted beneath a reflector in the shape of an inverted trough and housed, together with the reflector, in a trailer which can be attached to and pulled behind the same machine as that onto which the remainder of the system is retrofitted.

DETAILED DESCRIPTION OF THE PREFERRED EMBODIMENT

Figure 1:
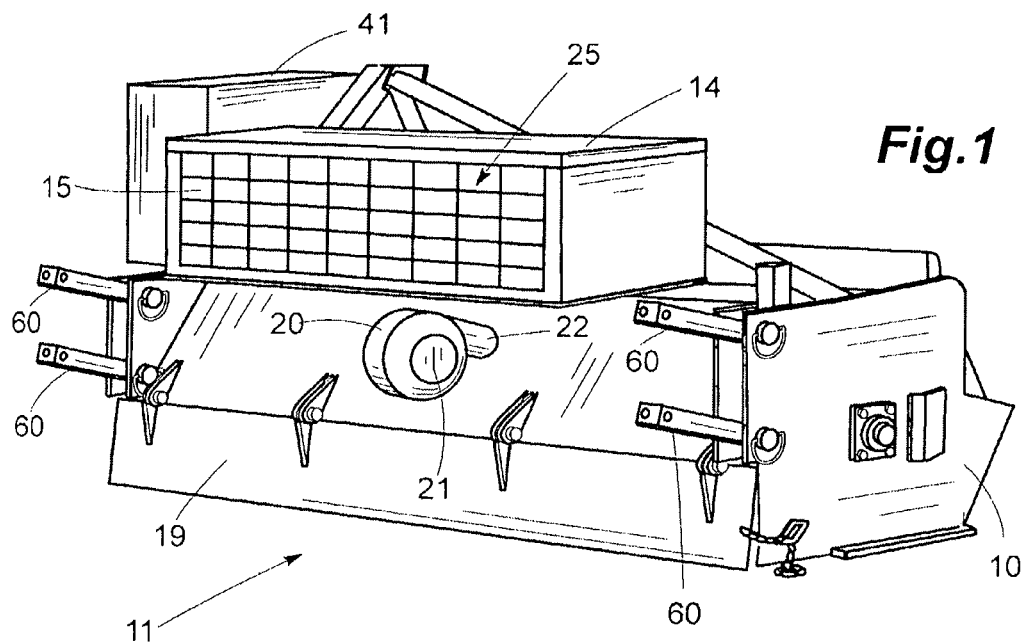
FIG. 1 is a rear view, in perspective, of the system according to the present invention, with the system retrofitted onto a machine which, in use, frees chicken litter caked on the house pad of a chicken house and then pulverizes it, the system being shown without the trailer in which an ultraviolet light source is housed attached to said machine.

In the drawings, the system for cleaning up animal litter, such as chicken litter, according to the present invention is retrofitted onto a machine 11 which is capable of breaking up caked litter on the chicken house floor or ground surface and then turning the litter into a flux of small pieces which can then be churned about briefly within a housing which, except on its underside, has generally closed walls. A suitable machine 11, known as the "Litter Saver", is offered by Priefert® Ranch Equipment of Mt. Pleasant, Tex. In the case of the "Litter Saver", an array of free swinging, helically disposed hammers, mounted within an otherwise closed, hood-like housing which opens downwardly, are rotated at speeds in excess of 700 rpm to lift the litter from the pad up in the house and, in the process, pulverize this bedding material. The three models of the "Litter Saver" currently on the market are the LS4, LS5 and LS7; they have 4, 5 and 7 foot wide housings, respectively. The system according to the present invention is preferably retrofitted onto a Litter Saver Model LS5.

The system itself comprises a high output ozone generator 12, such as the Jenesco, Inc. Model PRO-16 which produces up to 16 grams per hour of ozone. Housed in a compartment 14 which is mounted on the machine 11, the ozone generator 12 receives its input air flow through a mechanical filter 15 and a dessicant-containing dryer panel 16 filled with silicone gel or an equivalent chemical moisture absorbent. In use, the dryer panel 16 is disposed contiguous with the mechanical filter 15, which is juxtaposed between it and a lattice-covered opening 25 in one of the compartment's elongated side walls. Both the mechanical filter 15 and the dryer panel are preferably sized to completely cover the opening 25 when they are mounted side-by-side within the compartment 14 and deployed to condition the ozone generator's air input flow (FIGS. 1, 2, and 4).

Figure 2:
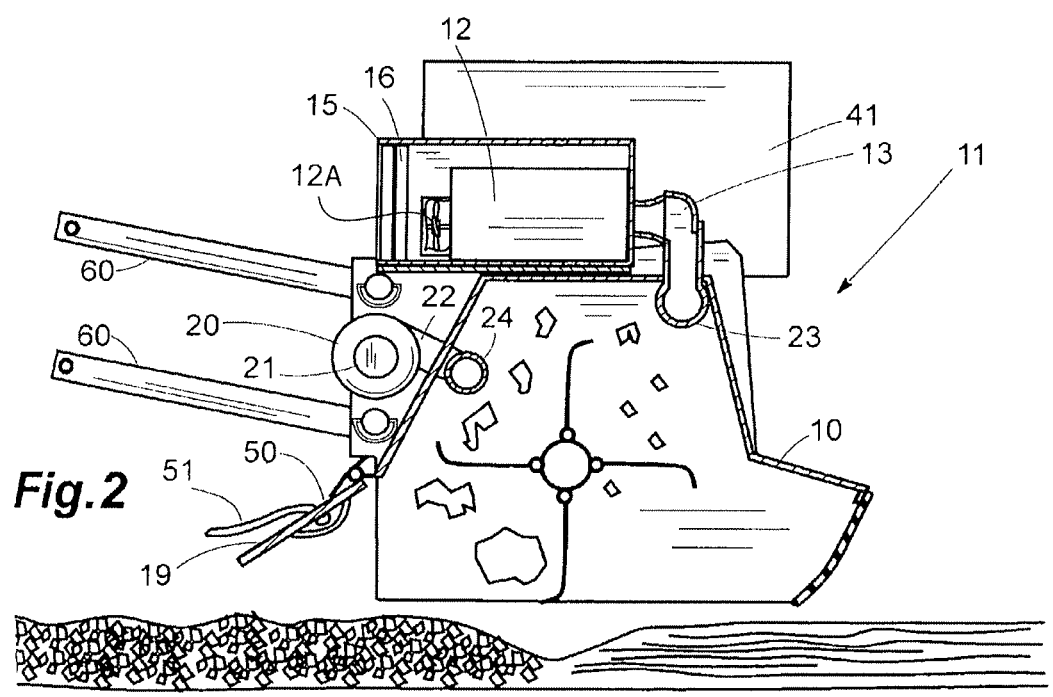
FIG. 2 is a cross-section taken along line 2-2 of FIG. 3 and on an enlarged scale, of the system retrofitted onto the machine according to FIG. 1, with the machine's rotary mechanism shown diagrammatically as it breaks apart caked litter and leaves behind a layer of pulverized litter.

During use, the ozone generator 12 delivers a stream of ozone-enriched air, via a manifold 13 which terminates in perforated piping 23 mounted within the hood-like housing 10 of machine 11, into a flux of small pieces of pulverized chicken litter and pathogen-laden dust particulates as they are being churned about within the housing (FIG. 2). The piping 23, in the preferred embodiment, extends horizontally across the width of the housing 10 and is perforated in such a way that the stream of ozone-enriched air is distributed generally evenly throughout it.

Figure 3:
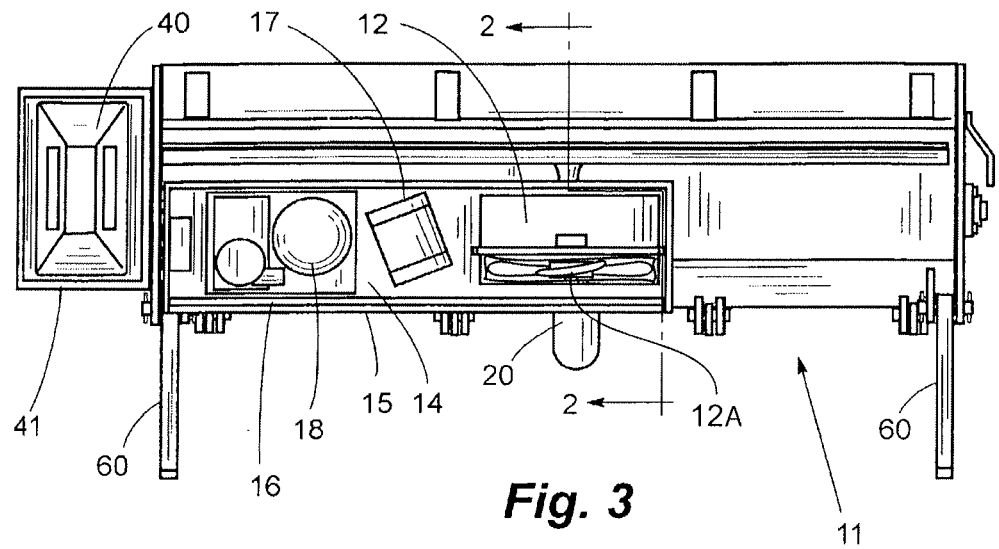
FIG. 3 is a plan view, on a reduced scale, of the system retrofitted onto the machine according to FIG. 1, showing the system's ozone generator, with the doors of a compartment housing the ozone generator opened to disclose its location.
Figure 4:
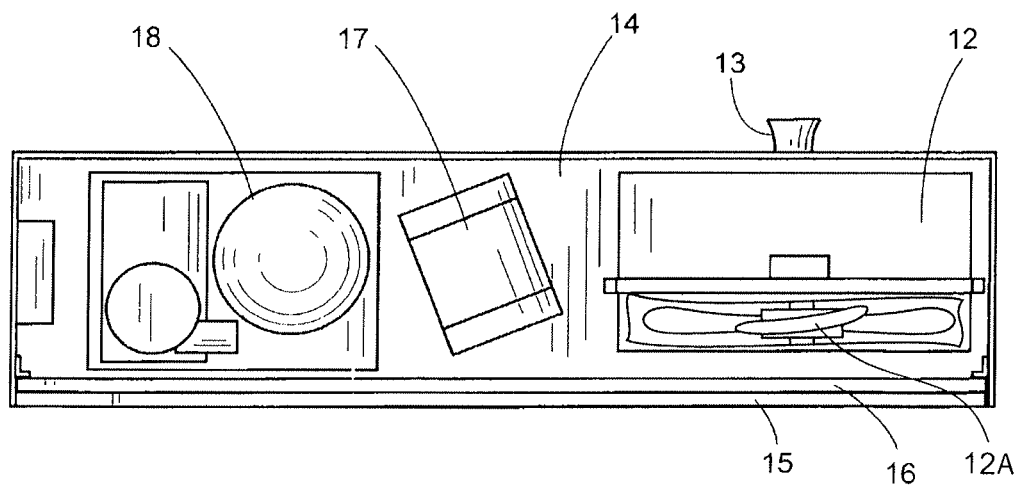
FIG. 4 is a top plan view, on an enlarged scale, of the ozone generator and its supporting equipment as shown in FIG. 3, with only a fragmentary portion of the manifold which fluidly connects the air flow output from the ozone generator to the interior of the housing for the rotary mechanism (shown diagrammatically in FIG. 2) being illustrated.

Sized to both kill pathogens in used chicken litter and neutralize ammonia odors emanating from it, the rate of ozone output from the ozone generator 12 can be enhanced, if need be, by raising the oxygen concentration in the air entering the ozone generator with the use of an oxygen enrichment device 18, also mounted inside the compartment 14 (FIGS. 3 and 4).

As is further illustrated in FIGS. 3 and 4, a heater 17, which, like the ozone generator 12 and the oxygen enrichment device 18, is protected from physical damage by the walls of the compartment 14, is positioned therein so that it can direct hot air towards the dryer panel 16 and recharge it by driving out moisture which may have been absorbed by the panel's desiccant.

In addition to the dryer panel 16, the system preferably includes a combination blower 20 and heater 21, such as those used for drying wet carpets and the like and which have an output air flow in the range of 1000-3000 CFM. As is best seen in FIG. 2, the combination blower 20 and heater 21 is fluidly connected via a manifold 22 which terminates in an elongated, perforated piping 24 mounted generally horizontally within the hood-like housing 10. During use, the combination blower 20 and heater 21, so fluidly connected, delivers hot air into the housing 10 and effectively reduces not only the relative humidity of the ozone-enriched air circulating within it but also the moisture content of the flux of small pieces of pulverized chicken litter and pathogen-laden dust particulates as they are churned about in this less humid air.

Means for determining the moisture content of the pulverized used chicken litter, after its exposure to ozone in the housing 10 and discharge therefrom, includes a moisture sensor probe 50 (FIG. 2). Mounted in a protective cage on the underside of a hinged door 19 on the lower back side of the housing 10 and connected by electrical wires 51 to a readout meter (not shown), the sensor probe 50, during use, continually measures the treated litter's moisture content and lets the operator know in real time, as he reads the meter, how the system is performing. If need be, he can then adjust the rate at which caked chicken litter is fed into the machine 11 in order to reduce the moisture content below 50 percent. A suitable sensor probe 50 and meter are the Models VH400-2M Soil-Sensor Probe and VG-Meter 200, respectively, made by Techno Gardener.

When an operator finds that the moisture content of treated litter is in excess of 50 percent, he can immediately try to lower it by reducing the speed at which he runs the tractor (not shown) as he pulls the retrofitted machine 11, or however else he may propel this equipment, across the used chicken litter. The operator may also find it necessary to make more than one pass with the retrofitted machine 11 in order to adequately dehydrate the litter. It is recommended that the moisture and ammonia levels be checked with a hand-held device after each pass with this device to determine it another pass it required. This allows the user to confirm that the litter/ground condition has been properly treated prior to adding any animals. The system as a whole is designed to clean up used chicken litter within a standard size commercial chicken house within one day's time or less.

In its preferred embodiment, the system according to the present invention further comprises means, including an ultra-violet light source, for further sanitizing the treated litter once the dust generated by the operation of the retrofitted machine 11 has settled. Irradiation with ultraviolet light also helps to eliminate un-wanted ozone discharged with the pulverized litter from the housing 10. Mounted proximate with a reflector 32 in the shape of an inverted-trough and housed, together with the reflector, in a trailer 30, ultraviolet light source 31 and its dual lamps 33, 34 can be moved across a bed of treated litter by connecting the trailer 30 to the machine 11 with the use of hitch bars 60 (FIGS. 5-8). While the trailer is so connected, the dust-generating rotary mechanism of the machine 11 must be temporarily disengaged in order to prevent further dust from being raised in such a way as to interfere with the irradiation process.

Figure 5:
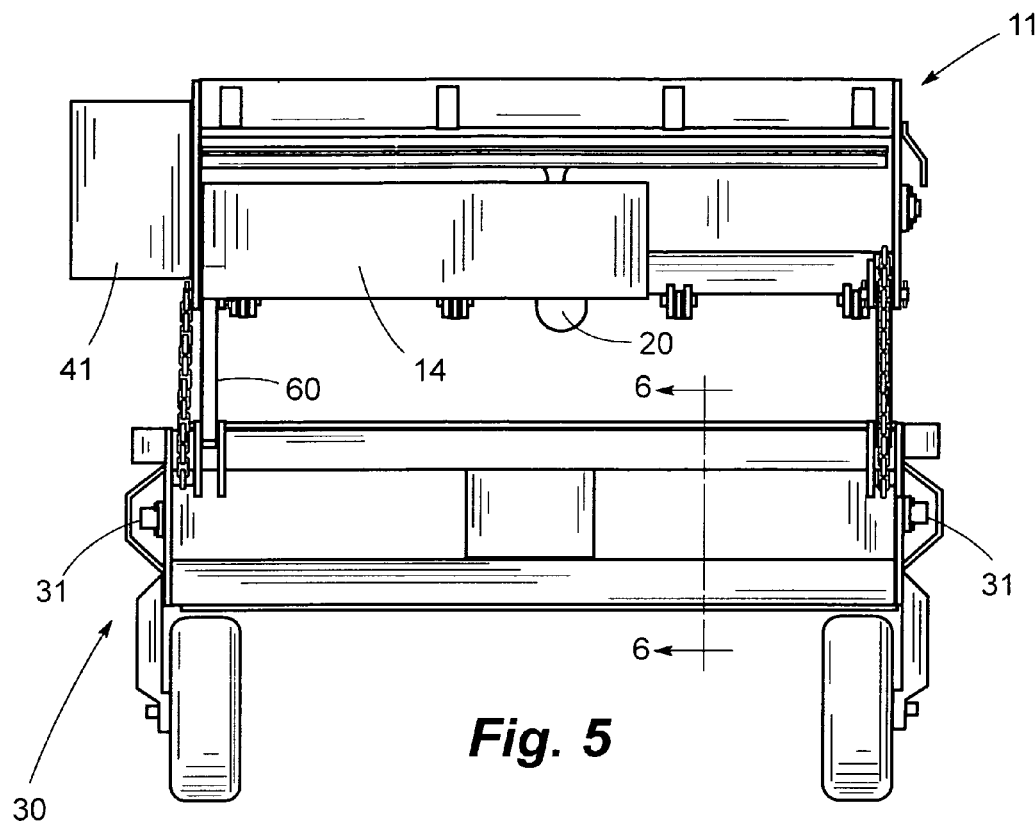
FIG. 5 is a top plan view of the system retrofitted onto the machine according to FIG. 1, the system being shown with the trailer in which an ultraviolet light source is housed attached to said machine.
Figure 6:
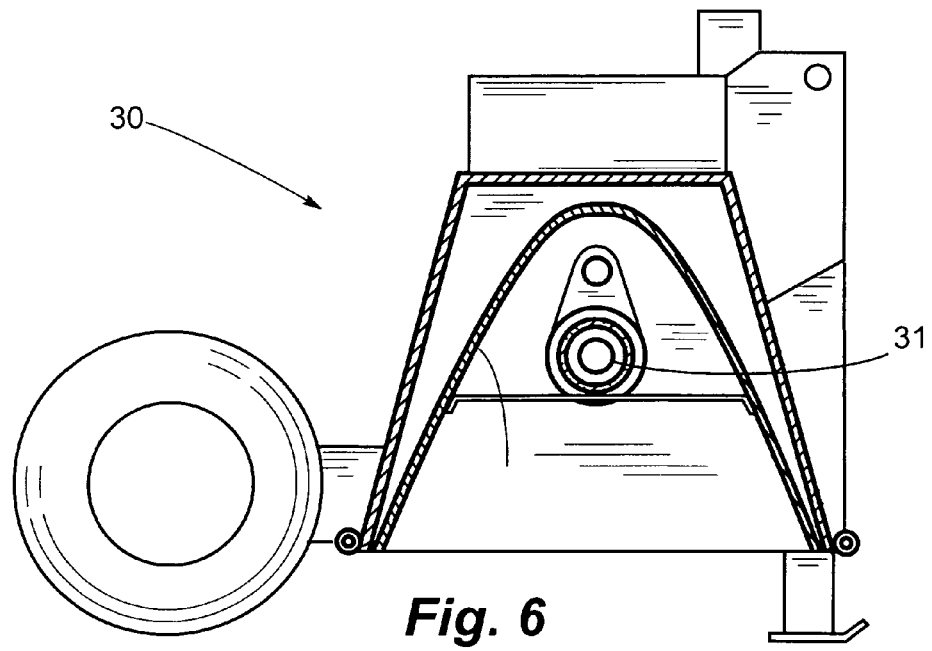
FIG. 6 is a cross-section, on an enlarged scale, taken along line 6-6 of FIG. 5, showing the ultraviolet light source and a reflector for it which are housed within the trailer.
Figure 7:
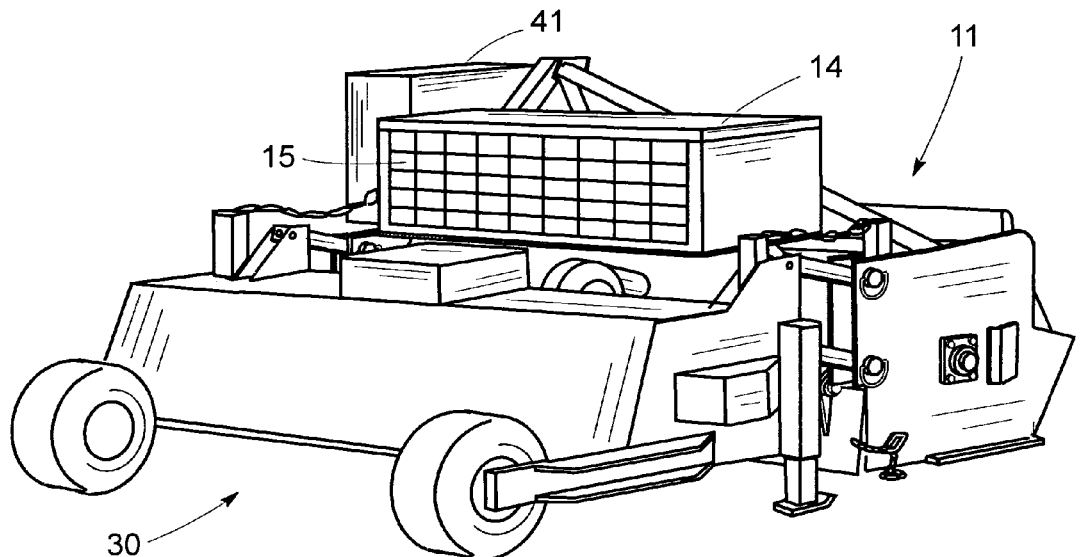
FIG. 7 is a rear view, in perspective of the system according to the present invention, with the system retrofitted onto a machine, which, in use, frees chicken litter caked on the house pad of a chicken house and then pulverizes it, the system being shown with the trailer in which an ultraviolet light source is housed attached to the machine.
Figure 8:
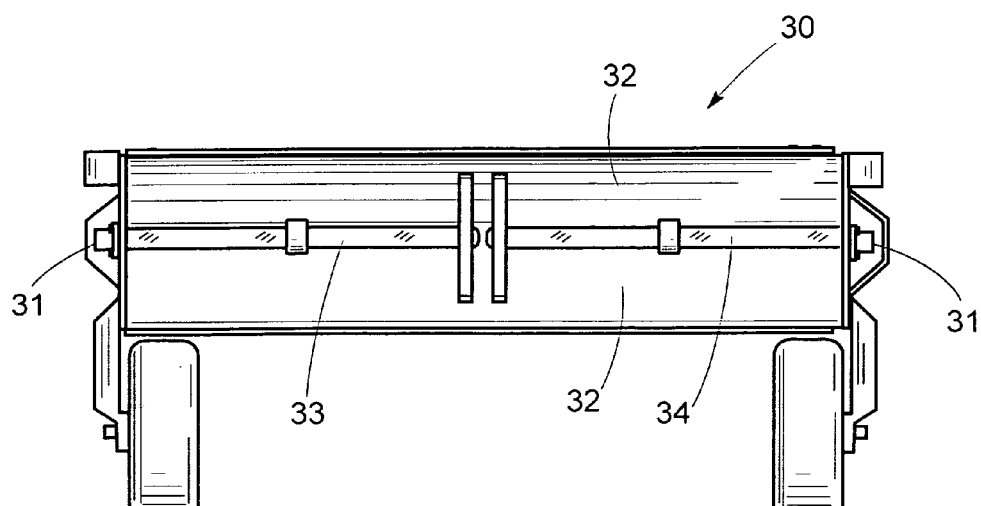
FIG. 8 is a bottom plan view, on the same scale as that used in FIG. 5, of the system's trailer and the ultra-violet light source lamps and reflector housed within it.

To power the system's ozone generator 12, blower 20, heaters 17 and 21 and the UV lamps 33, 34, a portable generator 40 is mounted in a protective housing 41 attached to the machine 11 (FIGS. 3 and 5). A suitable portable generator 40 is made by Honda as well as by several other manufacturers. A tractor employed to pull the retrofitted machine 11 may also have a power takeoff which can be utilized to drive a generator, there-by eliminating the need to start a second engine.

On the basis of field tests in which the system according to the present invention was used to clean up chicken litter in commerical chicken houses, the operator is strongly advised to protect himself from the dust generated in the operation of this system. Specifically, a disposable clean room garment (not shown) which can be fitted over the operator's head and clothing, such as the Uline Deluxe Protective Clothing Model No. S-17926 microporous coverall with hood, needs to be worn and thrown away at the end of the workday. Further, the operator needs to wear a pair of close-fitting safety goggles with anti-fogging lenses and a facepiece respirator with replaceable cartridges and filters suitable for reducing the risk of respiratory problems from dust and/or ozone inhalation.

Having thus described exemplary embodiments of a deodorizing, sterilizing and moisture reduction system for animal waste, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims.

It is claimed:

1. A system for treating pulverized matter, the system comprising:

a portable machine having a housing and a rotary mechanism mounted in the housing, the machine pulverizing waste material into a flux of small pieces and pathogen-laden dust particulates, during which the rotary mechanism, while in use, churns about within the housing;

an ozone generator comprising a fan connected to the housing to discharge ozone-enriched air evenly into the housing to expose litter in said flux to ozone in sufficiently high concentrations to kill pathogens in the litter and neutralize ammonia odors; and an ultraviolet light source housed in a trailer separate from the housing, wherein the ultraviolet light source irradiates dust generated by the rotary mechanism to sterilize the waste material and destroys associated ground-level ozone from the ozone generator.

2. The system as described in claim 1 further comprising:

a reflector mounted to the trailer proximate the ultraviolet light source, the reflector having the shape of an inverted trough.

3. The system as described in claim 1 wherein the housing has an interior and the ozone generator comprises a high output ozone generator that is fluidly connected to the housing, the fan forcing ozone-enriched air discharged from the high output ozone generator into the interior of the housing and distributing the ozone-enriched air generally evenly within the interior of the housing, so that the pulverized waste matter in said flux is exposed to ozone in sufficiently high concentrations to kill pathogens in and neutralize ammonia odors emanating from the litter.

4. The system according to claim 3, further comprising a desiccant-containing dryer panel, for conditioning air which enters the ozone generator.

5. The system of claim 4, further comprising:

an oxygen enrichment device that is configured to increase the oxygen concentration of air entering the high output ozone generator and a heater configured to recharge the desiccant-containing dryer panel by directing hot air towards the desiccant-containing dryer panel.

6. The system according to claim 3, further comprising a combination blower and heater assembly connected to the housing, the blower and heater assembly warming ozone-enriched air to reduce the humidity of the ozone-enriched air in the housing and lower the moisture content of the waste material in flux as it is churned about in the less humid air.

7. A system, which comprises:

(a) a portable machine having a housing having an interior area and a rotary mechanism mounted therewithin for pulverizing used animal litter into a flux of small pieces and pathogen-laden dust particulates, during which the rotary mechanism, while in use, churns about within the housing;

(b) a high output ozone generator connected to the housing, said high output ozone generator comprising means, including at least one fan, for forcing ozone-enriched air discharged from the ozone generator into the housing and distributing the ozone-enriched air generally evenly throughout the housing's interior using a manifold and piping to expose the used animal litter in said flux to ozone in sufficiently high concentrations to kill pathogens in the litter and neutralize ammonia odors emanating from the litter; and (c) an irradiating means comprising an ultraviolet light source housed in a trailer, the trailer separated from the housing and connected to the portable machine, wherein the ultraviolet light source sterilizes the ozone-treated litter and eliminates remaining ozone-enriched air.

8. The system according to claim 7, which further comprises means, including a desiccant-containing dryer panel, for conditioning the air which enters the ozone generator.

9. The system of claim 8, further comprising a heater configured to recharge the desiccant-containing dryer panel by directing hot air towards the desiccant-containing dryer panel.

10. The system according to claim 7, which further comprises means, including a combination blower and heater fluidly connected to the housing, for warming the ozone-enriched air as it circulates therewithin, thus reducing the relative humidity of the ozone-enriched air and lowering the moisture content of the used animal litter in said flux as it is churned about in the less humid air.

11. The system according to claim 7, wherein the irradiating means further includes a reflector, the reflector having the shape of an inverted trough and being housed, together with the ultraviolet light source which is mounted proximate with the reflector, in the trailer.

12. The system of claim 7, further comprising an oxygen enrichment device that is configured to increase the oxygen concentration of air entering the high output ozone generator.

13. An assembly for treating animal litter in use with a machine the machine having a housing and a rotary mechanism mounted in the housing for pulverizing used animal litter into a flux of small pieces and pathogen-laden dust particulates, the assembly comprising:

a high output ozone generator configured to be connected to the housing, said high output ozone generator comprising a fan forcing ozone-enriched air discharged from the ozone generator into the interior of the housing and distributing the ozone-enriched air generally evenly throughout the interior of the housing, so that the used animal litter in said flux is exposed to ozone in sufficiently high concentrations to kill pathogens in the litter and neutralize ammonia odors emanating from the litter; and an ultraviolet light source mounted in a trailer separate from the housing, the trailer configured to be mounted to the housing of the machine, wherein the ultraviolet light source sterilizes dust generated by the rotary mechanism and destroys the ground-level ozone created by the ozone generator.

14. The apparatus according to claim 13 further comprising:
a desiccant-containing dryer panel for conditioning air which enters the ozone generator.

15. The apparatus according to claim 13 further comprising:
a combination of a blower and a heater configured to be fluidly connected to the housing, the combination blower and heater warming ozone-enriched air as it circulates in the interior of the housing to reduce the relative humidity of the ozone-enriched air and lower the moisture content of the used animal litter in said flux as it is churned about in the less humid air.

16. The apparatus according to claim 13 further comprising:
a sensor probe configured to be affixed to the housing proximate a base of the housing, the probe measuring, in real time, the moisture content of the used animal litter pulverized by said rotary mechanism as the litter is being discharged from the housing after the litter is treated with the ozone-enriched air.

17. The apparatus according to claim 13 further comprising:
a reflector housed in the trailer, the reflector having a shape of an inverted trough, wherein the ultraviolet light source is mounted proximate to the reflector and the trailer is configured to move across a bed of pulverized animal litter.

18. The apparatus of claim 13, further comprising an oxygen enrichment device that is configured to increase the oxygen concentration of air entering the high output ozone generator.

19. The apparatus of claim 13, further comprising a manifold and piping to evenly distribute the ozone-enriched air within the interior of the housing.

20. The apparatus of claim 14, further comprising a heater configured to recharge the desiccant-containing dryer panel by directing hot air towards the desiccant-containing dryer panel.

* * * * *